Feb. 20, 1968   H. L. DIMOND ET AL   3,370,074
PROCESS FOR THE PREPARATION OF CARBOXYLIC ACID SALTS
Filed Dec. 30, 1963
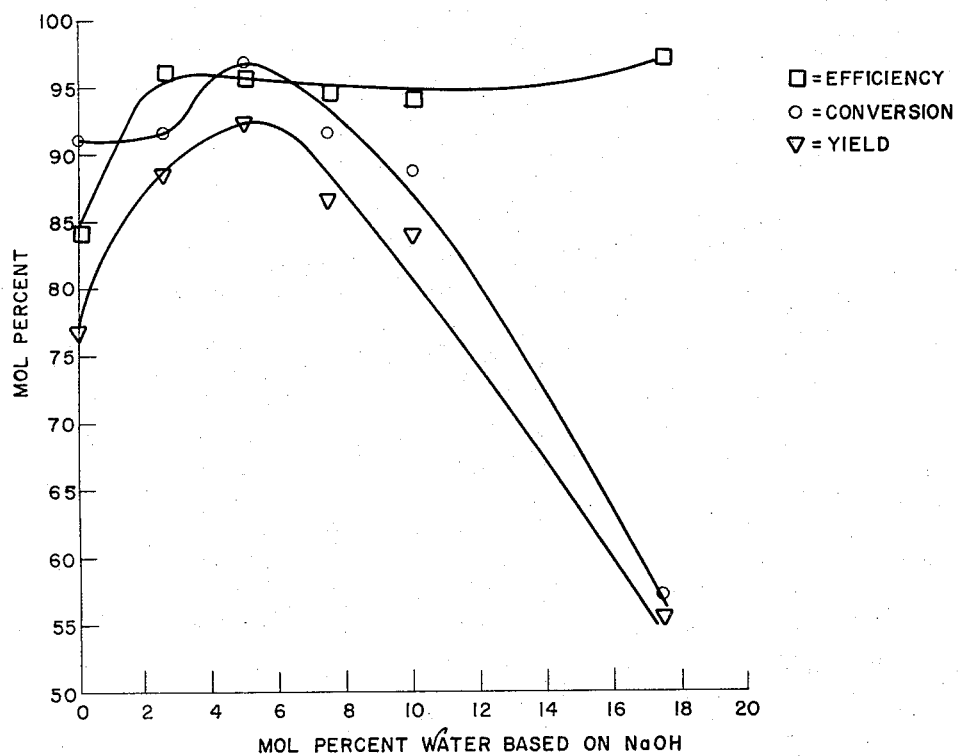
INVENTOR.
HAROLD L. DIMOND
ARTHUR C. WHITAKER
BY

3,370,074
PROCESS FOR THE PREPARATION OF
CARBOXYLIC ACID SALTS
Harold L. Dimond, Ross Township, Allegheny County,
and Arthur C. Whitaker, Fox Chapel Borough, Pa., assignors to Gulf Research & Development Company,
Pittsburgh, Pa., a corporation of Delaware
Filed Dec. 30, 1963, Ser. No. 334,102
22 Claims. (Cl. 260—413)

This invention relates to an improved process for preparing organic acid salts by the oxidative dehydrogenation of certain oxygen-containing organic compounds with an alkali metal compound.

The oxidative dehydrogenation of an oxygen-containing organic compound, such as a primary alcohol, in the presence of caustic, such as an alkali metal hydroxide, to produce the salt of the corresponding organic acid is known. The process suffers, however, from low yields, especially in the oxidative dehydrogenation of the higher molecular weight oxygen-containing compounds, such as those obtained by the hydroformylation of the higher molecular weight olefins (the oxo process). The present invention overcomes the low yield disadvantages of the processes of the prior art.

In accordance with the invention, high yields of an organic acid salt are obtained by the oxidative dehydrogenation of at least one oxygen-containing compound reactant selected from the group consisting of primary alcohols, ethers having at least two hydrogen atoms on at least one of the carbon atoms adjacent to the ether oxygen atom, aldehydes, aldols and esters by a process which comprises reacting under oxidative dehydrogenation conditions in the liquid phase a mixture consisting essentially of the oxygen-containing compound reactant, a substantially anhydrous alkali metal compound selected from the group consisting of alkali metal oxides and hydroxides, and between 0.5 and 8 mol percent water based on the alkali metal compound employed.

The charge stock for the process of this invention can comprise any oxygen-containing organic compound selected from the class consisting of primary alcohols, ethers having at least two hydrogen atoms on a carbon atom adjacent to the ether oxygen atom, aldehydes, aldols, esters and mixtures thereof. By a primary alcohol is meant any compound containing an hydroxyl group directly connected to a carbon atom having at least two substituent hydrogen atoms. These oxygen-containing compounds can have between 1 and 40 carbon atoms per molecule. The preferred oxygen-containing organic compound reactants are those having between 4 and 20 carbon atoms per molecule. It is understood that the oxygen-containing compound reactants defined above may be polyfunctional, if desired, and include compounds such as, for example, acetals and glycols where at least one of the oxygen atoms is directly connected to a carbon atom having two substituent hydrogen atoms. The oxygen-containing compound reactants can be either straight or branched chain in structure. The charge stock can comprise a mixture of straight and branched chain primary alcohols, straight and branched chain aldehydes, admixtures of primary alcohols and aldehydes, together with esters, aldols and ethers as defined above, if desired.

The oxygen-containing organic compounds can be obtained from any suitable source. One suitable source includes the products obtained by the hydroformylation of olefins having between 2 and 39 carbon atoms per molecule. The hydroformylation reaction can be operated by methods well known in the art, such as those described, for example, in U.S. Patents 2,748,168 and 2,743,302. In the hydroformylation reaction, the olefin is reacted in the presence of carbon monoxide and hydrogen to form a saturated aldehyde having one more carbon atom than the original olefin. The catalyst, for example, can be any cobalt compound or cobalt itself, supported or unsupported. Preferred catalysts are the hydrocarbon soluble cobalt salts of aliphatic carboxylic acids having from 8 to 16 carbon atoms. Examples of suitable catalysts include cobalt naphthenate and cobalt octanoate. The hydroformylation reaction generally occurs at a temperature between 110° and 200° C. and increased pressures of between 1500 and 4500 p.s.i.g. The hydrogen to carbon monoxide weight ratio will normally be about 1:1, although ratios between 0.8:1 and 5:1 can be employed. The hydroformylation reaction products are normally decobalted and then hydrogenated. The process of this invention is applicable to the treatment of the intermediate or final products of the hydroformylation reaction.

Examples of suitable oxygen-containing compounds which can be used in the process of this invention include methyl alcohol;
n-propyl alcohol;
isobutyl alcohol;
n-decyl alcohol;
lauryl alcohol;
myristyl alcohol;
cetyl alcohol;
stearyl alcohol;
benzyl alcohol;
3,7-dibutyl hexadecyl alcohol;
cinnamyl alcohol;
n-triacontanol;
n-pentatriacontanol;
n-tetracontanol;
ethylene glycol;
1,3-butanediol;
glycerol;
acetaldehyde;
n-butyraldehyde;
isovaleraldehyde;
isooctylaldehyde;
tridecylaldehyde;
stearaldehyde;
benzaldehyde;
crotonaldehyde;
2,5-dipentyl-eicosanal;
4-tridecyldocosanal;
4-decyltriacontanal;
aldol;
2-decyl-3-hydroxytetracosanal;
2-octyl-3-hydroxydodecanal;
2-pentyl-3-hydroxynonanal;

2-isopropyl-3-hydroxy-5-methyl hexanal;
2-undecyl-3-hydroxynonadecanal;
2-heneicosanyl-3-hydroxytetradecanal;
2-eicosanyl-3-hydroxyeicosanal;
1,1-didecoxydecane;
1,1-dipentoxypentacosane;
1,1-dioctoxy-tetracosane;
ethyl acetate;
methyl isovalerate;
ethyl pelargonate;
isopropyl stearate;
methyl lignocerate;
tetradecylhexadecanoate;
heptadecyloctadecanoate;
nonadecylheneicosanoate;
diethyl ether;
methyl butyl ether;
di-n-hexyl ether; di-isooctyl ether;
methyl decyl ether;
di-dodecyl ether;
ethylene glycol dimethyl ether;
decyl eicosyl ether;
heptadecyl octadecyl ether; and
pentacosyl pentadecyl ether.

The alkali metal compound for this reaction can be any substantially anhydrous alkali metal compound selected from the group consisting of alkali metal oxides and hydroxides. These include the oxides and hydroxides of sodium, lithium, potassium, rhubidium, cesium, francium, barium, calcium, strontium, radium and magnesium. The preferred alkali metal oxides and hydroxides are those of sodium and potassium.

The amount of alkali metal compound to employ is substantially the stoichiometric requirement to oxidize all of the oxygen-containing compound reactants to the corresponding acids. The mol ratio of the alkali metal compound to the oxygen containing compound reactant can vary between about 0.5:1 and 4:1, and preferably between 1:1 and 1.5:1.

It has been found that high yields of the desired organic acid salts are obtained when the water content of the reaction mixture is maintained within certain narrow limits, namely, between 0.5 and 8 mol percent based on the alkali metal compound employed. The preferred water content is between 2.5 and 7.5 mol percent based on the alkali metal compound employed with the most preferred water content being between 3 and 6 mol percent. The optimum water content is 5 mol percent based on the alkali metal compound. Amounts of water above and below the described limits result in reduced yields of the desired organic acid salts.

The function of the water is believed to be to inhibit the undesirable formation of the alkali metal alkoxide. That is, taking in alcohol as a typical charge stock, it can react according to the following equation:

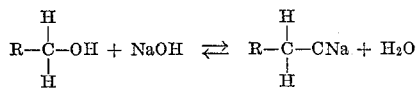

The formation of R–CH$_2$ONa reduces the yield of the desired

If H$_2$O is to be effective to inhibit the formation of the alkali metal alkoxide, the water content should be present in the oxygen-containing compound reactant phase rather than the alkali metal compound phase since the alkoxide tends to dissolve in the alcohol phase. The manner in which the water is added to the reaction mixture is therefore critical.

The water can be added to the oxygen-containing compound reactant prior to the addition of the anhydrous alkali metal compound or the water can be added to the mixture of the anhydrous alkali metal compound and the oxygen-containing compound reactant just before reaction begins. It is preferred, however, to add the water last in the sequence of addition of reactants. If the water is added with the alkali metal compound, it will not be as effective for the purpose desired, namely, to inhibit the formation of the alkali metal alkoxide. The amounts of water required are so small that, if added with the alkali metal compound, they would be insufficient to prepare an aqueous solution. In addition, the alkali metal compounds are known drying agents because of their excellent water retention properties. Consequently, the added water would remain in the alkali metal phase. As a result, the desired water content in the organic phase would be produced in situ along with the undesired formation of the alkali metal alkoxide, according to the equation above. This would reduce the desired yields of the organic acid salts.

In accordance with the invention, therefore, the alkali metal compound employed is substantially anhydrous. It is normally added as a solid to the reaction zone. The water is added as a separate phase either in admixture with the oxygen-containing compound reactant or to the mixture of the alkali metal compound and oxygen-containing compound reactant. When the alkali metal compound employed is substantially anhydrous, and the water is added in the amount and manner indicated, there is no necessity to preheat the oxygen-containing compound reactant and the alkali metal compound to reaction temperature before admixture since yields of the desired salts are very high with only minor amounts of undesired by-products.

The function of the reaction temperature is to promote the rate of reaction. The reaction temperature can generally vary between about 175° and 400° C. The preferred temperatures depend to some degree upon the type of oxygen-containing compound reactant employed. For the oxidative dehydrogenation of aldehydes, a preferred reaction temperature is between 175° and 260° C. For the other oxygen-containing compound reactants defined above, the preferred reaction temperature is between 240° and 350° C. with the most preferred temperatures being between 320° and 330° C.

The function of reaction pressure is to maintain the reactants in the liquid phase. The reaction pressure can vary over a wide range, for example, from 0 to 2000 p.s.i.g., or higher, with preferred reaction pressures between 75 and 750 p.s.i.g. The most preferred pressures are between 100 and 400 p.s.i.g.

The reaction time can vary between 0.25 and 6 hours or more. Prolonged contacting times at elevated temperatures promote decomposition of the soap products into undesirable side products such as carbonates. In general, the higher the temperature, the shorter the maximum contacting time. At temperatures about 300° C., for example, the preferred contacting times are between 0.5 and 2 hours after preheating to reaction temperature. Longer contacting times within the broad range defined above can be employed at the lower reaction temperature.

Another problem which has hitherto been found in the subject reaction is the difficulty involved in separating the desired organic acid salt from the remainder of the reaction mixture. Normally, the reaction mixture is allowed to cool to room temperature before neutralizing the product with an aqueous mineral acid. The organic acid salts solidify at temperatures below about 220° to 260° C., which makes handling of the reaction mixture more difficult. An aqueous mineral acid is usually added to the solid organic acid salts at room temperature to convert the salts to the corresponding organic acid. The aqueous acid was previously not added at the higher temperatures since it was expected that such an addition would produce a violent evolution of steam. It has been found, contrary to expectations, that an aqueous mineral acid can be added to the hot liquid organic acid salt before solidification occurs, if it is added slowly. The aqueous mineral acid is preferably added at a temperature just above the solidification temperature which is usually in the range between 220° and 260° C. Adding the aqueous mineral acid while the acid salts are still liquid has the advantage of a smoother, faster reaction; the elimination of the waiting period for cooling; the use of the same reaction vessel for both the preparation of the salt and the acid; and, in most instances, the preparation of an organic acid which is liquid at room temperatures and more easily handled rather than an organic acid salt which is solid under the same conditions.

The mineral acids which are selected from the group consisting of hydrochloric, sulfuric, phosphoric, sulfurous, phosphorus and hydrobromic can suitably be employed. Any acid concentration is satisfactory, but dilute acids are preferred having concentrations between about 10 and 40 percent. The amount of acid is usually at least stoichiometrically equivalent to the acid salt concentration. The mol ratio of mineral acid to acid salt can therefore vary between 0.5:1 and 1.5:1 with preferred molar ratios between 1:1 and 1.1:1.

It was unexpected that violent steam evolution did not occur upon the addition of the aqueous mineral acid to the reaction mixture. It is believed that violent steam evolution was avoided by a controlled slow rate of addition of the aqueous mineral acid. As the mineral acid is added to the reaction mixture, the temperature continues to drop gradually, yet salt solidification does not occur. It is believed the initial mineral acid converts some of the acid salt into a liquid, high-boiling organic acid which in turn solubilizes some of the molten salt. The rate of addition of mineral acid is such that sufficient organic acid is formed to solubilize the acid salt before the reaction temperature is reduced below the solidification temperature of the unsolubilized salt. The uniform rate of addition can be between 0.25 and 3 mols of mineral acid per mol of acid salt per hour with the preferred rate of addition between 0.3 and 2.5 mols/mol/hr., and the most preferred rate of addition is between 0.6 and 2 mols/mol/hr.

The invention will be further described with reference to the following experimental work.

A series of experiments were performed to determine the effect of added small amounts of water on the oxidative dehydrogenation of isooctyl alcohol in the presence of NaOH. The isooctyl alcohol was obtained by the hydroformylation and subsequent hydrogenation of a mixture of branched chain heptenes. The mixture of branched chain heptenes was the 87° C. to 94° C. fraction (ASTM) of the product from the copolymerization of propylene and butene. The properties of isooctyl alcohol are given on Table I below. In these experiments a one-liter Inconel-lined, turbo-stirred autoclave, equipped with a cooling coil and external condenser was employed. The procedure involved adding the isooctyl alcohol and anhydrous solid NaOH pellets to the autoclave followed by careful addition of the desired amount of water. The temperature was slowly raised over one and three-fourths hours to about 285° C. while the pressure increased to 270 p.s.i.g. The pressure was held at 270 p.s.i.g. by the gradual release of $H_2$ formed. The reaction time was one hour. The pressure was permitted to fall to 200 p.s.i.g. while the temperature was reduced to 230° C.

TABLE I.—TYPICAL INSPECTIONS OF ALCOHOLS

| | Isooctyl | Tridecyl | $C_{10}$ Bottoms |
|---|---|---|---|
| Specific Gravity, 20°/20° C | 0.833 | 0.845 | 0.857 |
| Color, APHA (By ASTM D-1209–54) | 3 | 3 | |
| Refractive Index, $n_D^{20}$ | 1.4312 | 1.4473 | |
| Sulfur, p.p.m | 3 | 1 | |
| Water, percent by weight | 0.020 | 0.008 | 0.12 |
| Acidity as Acetic Acid, percent by weight | 0.001 | 0.003 | |
| $C_8$ Carbonyl Content, percent by weight | 0.01 | | |
| $C_{13}$ Carbonyl Content, percent by weight | | 0.04 | |
| Carbonyl Content, percent by weight as CO | | | 1.8 |
| Hydroxyl Number, Mg. KOH/gm | | | 132 |
| Distillation, ASTM D-1078: | | | |
| Initial Boiling Point, ° C | 185 | 254.9 | |
| Dry Point, ° C | 188.5 | 262.9 | |
| Distillation, ASTM D-158: | | | |
| Initial Boiling Point, ° C | | | 224 |
| Dry Point, ° C | | | 352 |
| 10% | | | 248 |
| 50% | | | 322 |
| 90% | | | 347 |

The product was recovered as an acid by the careful, dropwise addition (about 2 mols of mineral acid per mol of salt per hour) to the molten salt at 230° C. of the stoichiometric amount of aqueous HCl having a concentration between 16 and 38 percent. Almost no steam or other vapor was observed. After addition of the acid, the product temperature was between about 100° and 150° C. The product was cooled further, withdrawn from the bomb, and the acid layer water washed to remove the excess HCl. The yield of organic acid was determined by titration. Results of this series of experiments are shown in Table II below.

TABLE II.—EFFECT OF TRACES OF $H_2O$ ON THE OXIDATIVE DEHYDROGENATION OF ISOOCTYL ALCOHOL WITH NaOH

[Pressure, p.s.i.g.—270; Temperature, ° C.—290]

| Example No. | ROH/NaOH, Mol | Mol percent $H_2O$ based on NaOH | Time, hours | Efficiency, Mol | Conversion, mol percent | Yield, mol percent |
|---|---|---|---|---|---|---|
| 1 | 1.0 | 0.0 | 1.0 | 84.4 | 91.2 | 77.0 |
| 2 | 1.0 | 2.5 | 1.0 | 96.2 | 91.6 | 88.1 |
| 3 | 1.2 | 5.0 | 1.0 | 95.6 | 97.0 [1] | 92.7 |
| 4 | 1.0 | 7.5 | 1.5 | 94.9 | 91.6 | 86.9 |
| 5 | 1.2 | 10.0 | 1.0 | 94.6 | 88.9 [1] | 84.2 |
| 6 | 1.0 | 17.5 | 1.0 | 97.6 | 57.2 | 55.8 [2] |

[1] This conversion is based on the stoichiometric amount of alcohol, that is, a 1.0 ROH:NaOH mol ratio rather than the 1.2 ROH:NaOH mol ratio actually employed.
[2] Example 6 indicates, by its poor yield and conversion, the deleterious effect of adding too much water.

The data in Table II are plotted on the figure attached.

It can be seen from the attached figure that the conversion of alcohol and yield of acid are optimized when the mol percent water based on the NaOH is between 0.5 and 8 and particularly at 5 mol percent water where both conversion and yield are optimized.

The experiments of Examples 1 through 6 in Table II were carried out at 270 p.s.i.g. and 290° C. Example 7 was carried out in the same manner as above except the run temperature was 325° C., the pressure was 150 p.s.i.g., the reaction time was only 0.5 hour, the water content was 5 mol percent based on the NaOH, and the NaOH to isooctyl alcohol mol ratio was 1.0. The conversion was 98.5 percent, the yield of acid 98.4 percent giving an efficiency of 99.9 percent.

A comparison of Example 7 with Example 3 above, shows that a higher temperature and shorter contact time operation are preferred.

EXAMPLE 8

Example 7 was repeated except the reaction time was 1 hour, the average reaction temperature was 330° C. and the alcohol was tridecyl alcohol. The tridecyl alcohol was obtained by the hydroformylation and subsequent hydrogenation of a mixture of branched chain $C_{12}$ olefins. The $C_{12}$ olefins were the 186° C. to 195° C. fraction (ASTM) of the product from the sulfuric acid polymerization of propylene. Properties of the tridecyl alcohol are also given on Table I above. The conversion was 100 percent, the yield of $C_{13}$ acid was 95.2 percent and the efficiency was 95.2 percent.

Example 8 shows that the process of the subject invention is equally applicable to the higher carbon number alcohols.

A second series of experiments was performed to investigate the possibility of employing an oxo polymer bottoms fraction as a charge stock for the preparation of organic acids. The charge stock comprised an oxo $C_{10}$ polymer bottoms. The oxo $C_{10}$ polymer bottoms was the 224° C. plus fraction of the product prepared by the hydroformylation and subsequent hydrogenation of a mixture of branched chain $C_9$ olefins (propylene trimer) boiling between 138° and 146° C. (ASTM D–1078). The propylene trimer was prepared by the polymerization of propylene using a phosphoric acid catalyst. The properties of the oxo $C_{10}$ polymer bottoms are also given on Table I above. The procedure for this series of experiments was the same as that for the first series of experiments noted above. The reaction conditions, yield and conversion figures for the experiments are given in Table III below.

TABLE III.—DECANOIC ACID FROM OXO DECYL ALCOHOL POLYMER BOTTOMS
[$H_2O$ = 5 mol percent on NaOH]

| Example No. | Pressure, p.s.i.g. | Temp., ° C. | NaOH/ROH, mol percent | Time, hrs. | Percent Yield | Percent Conversion |
|---|---|---|---|---|---|---|
| 9 | 270 | 300 | 4 | 1.0 | 197.5 | 97.8 |
| 10 | 270 | 290 | 3 | 0.5 | 156.6 | 98.5 |
| 11 | 230 | 290 | 2 | 1.0 | 135.7 | 87.6 |
| 12 | 150 | 325 | 2 | 1.0 | 156.0 | 94.1 |

In all of the examples, the optimum 5 mol percent water based on the NaOH was employed.

Referring to Table III, a comparison of Examples 9 through 11 shows that at temperatures of about 290° C., a linear increase in yield results from an increase in the mol ratio of NaOH to alcohol in the oxo bottoms from 2 to 4. Example 12 at 325° C. indicates the yield of acid is about 20 percent higher at this increased temperature.

The yields in Examples 9 through 12 are based on the alcohol present in the oxo bottoms. The observance of yields near the 200 percent level indicates there is present in the oxo bottoms, as much of other oxidizable, oxygenated compounds as there is alcohol. These "other oxygenated compounds" include acetals, ethers, ether alcohols and others. The NaOH to alcohol mol ratios of 2 to 4 used in Examples 9 through 12 are in reality much lower based on the total mols of oxidizable oxygen-containing compound reactants present in the oxo bottoms.

EXAMPLE 13

In this run, 1 mol of n-decene-1 was charged along with 1 mol of isooctyl alcohol, 1 mol of water and 2 mols of solid anhydrous NaOH to the reactor. The reaction conditions included a temperature between 300° and 320° C., a pressure of 270 p.s.i.g., and a reaction time of 3.25 hours. The mol percent water based on the NaOH was 50 percent. The conversion, yield, and efficiency were 99.1, 92.2, and 93.6 mol percent respectively.

A comparison of Example 13 with Examples 1 through 6 above shows that when a solvent is employed, such as n-decene-1, the water content which can be tolerated without loss of yield is much greater. The charge stocks for the subject reaction therefore consists essentially of the oxygen-containing compound reactant, the substantially anhydrous alkali metal compound, and a regulated small amount of water indicated above.

Resort may be had to such variations and modifications as fall within the spirit of the invention and the scope of the appended claims.

We claim:
1. A process for the preparation of a salt of at least one oxygen-containing organic acid by the oxidative dehydrogenation of at least one oxygen-containing compound reactant selected from the group consisting of unsubstituted aliphatic and unsubstituted monocyclic aralkyl primary alcohols having between 1 and 40 carbon atoms; unsubstituted aliphatic and unsubstituted monocyclic aralkyl aldehydes having between 1 and 40 carbon atoms; unsubstituted aliphatic aldols having between 1 and 40 carbon atoms; unsubstituted aliphatic acetals having between 1 and 40 carbon atoms and at least two hydrogen atoms on at least one of the carbon atoms adjacent to at least one of the ether oxygen atoms; unsubstituted aliphatic monoethers having between 1 and 40 carbon atoms and at least two hydrogen atoms on at least one of the carbon atoms adjacent to the ether oxygen atom; and organic esters having between 1 and 40 carbon atoms wherein the acid and alcohol portions of the ester are aliphatic hydrocarbon radicals, which comprises reacting under oxidative dehydrogenation conditions a mixture consisting essentially of said oxygen-containing compound reactant, a substantially anhydrous alkali metal compound selected from the group consisting of alkali metal oxides and hydroxides, and between 0.5 and 8 mol percent water based on said alkali metal compound.

2. A process according to claim 1 where the oxygen-containing compound reactant has between 4 and 20 carbon atoms per molecule.

3. A process according to claim 1 where the alkali metal is sodium hydroxide.

4. A process according to claim 1 where the water content is between 2.5 and 7.5 mol percent based on said alkali metal compound.

5. A process for the preparation of a salt of at least one oxygen-containing organic acid by the oxidative dehydrogenation of at least one oxygen-containing organic compound reactant selected from the group consisting of unsubstituted aliphatic and unsubstituted monocyclic aralkyl primary alcohols having between 1 and 40 carton atoms; unsubstituted aliphatic and unsubstituted monocyclic aralkyl aldehydes having between 1 and 40 carbon atoms; unsubstituted aliphatic aldols having between 1 and 40 carbon atoms; unsubstituted aliphatic acetals having between 1 and 40 carbon atoms and at least two hydrogen atoms on at least one of the carbon atoms adjacent to at least one of the ether oxygen atoms; unsubstituted aliphatic monoethers having between 1 and 40 carbon atoms and at least two hydrogen atoms on at least one of the carbon atoms adjacent to the ether oxygen atom; and organic esters having between 1 and 40 carbon atoms wherein the acid and alcohol portions of the ester are aliphatic hydrocarbon radicals which comprises subjecting a reaction mixture consisting essentially of said oxygen-containing compound reactant, a substantially anhydrous alkali metal compound selected from the group consisting of alkali metal oxides and hydroxides and between 0.5 and 8 mol percent water based on the alkali metal compound to oxidative dehydrogenation conditions, said reaction mixture being prepared by adding said water to a mixture of said oxygen-containing compound reactant and said substantially anhydrous alkali metal compound.

6. A process for the preparation of a salt of at least one oxygen-containing organic acid by the oxidative dehydrogenation of at least one oxygen-containing organic compound reactant selected from the group consisting of unsubstituted aliphatic and unsubstituted monocyclic aralkyl primary alcohols having between 1 and 40 carbon atoms; unsubstituted aliphatic and unsubstituted monocyclic aralkyl aldehydes having between 1 and 40 carbon atoms; unsubstituted aliphatic aldols having between 1 and 40 carbon atoms; unsubstituted aliphatic acetals having between 1 and 40 carbon atoms and at least two hydrogen atoms on at least one of the carbon atoms adjacent to at least one of the ether oxygen atoms; unsubstituted aliphatic monoethers having between 1 and 40 carbon atoms and at least two hydrogen atoms on at least one of the carbon atoms adjacent to the ether oxygen atom; and organic esters having between 1 and 40 carbon atoms wherein the acid and alcohol portions of the ester are aliphatic hydrocarbon radicals which comprises subjecting a reaction mixture consisting essentially of said oxygen-containing compound reactant, a substantially anhydrous alkali metal compound selected from the group consisting of alkali metal oxides and hydroxides and between 0.5 and 8 mol percent water based on the alkali metal compound to oxidative dehydrogenation conditions, said reaction mixture prepared by adding said substantially anhydrous alkali metal compound to a mixture of said oxygen-containing compound reactant and said water.

7. A process for the preparation of a salt of an oxygen-containing organic acid by the oxidative dehydrogenation of an unsubstituted aliphatic or monocyclic aralkyl primary alcohol which comprises subjecting a reaction mixture consisting essentially of said alcohol, a substantially anhydrous alkali metal compound selected from the group consisting of alkali metal oxides and hydroxides, and between 0.5 and 8 mol percent water based on said alkali metal compound to oxidative dehydrogenation conditions and thereafter recovering said organic acid salt.

8. A process for the preparation of a salt of at least one oxygen-containing organic acid by the oxidative dehydrogenation of at least one unsubstituted aliphatic or monocyclic aralkyl primary alcohol having between 4 and 20 carbon atoms per molecule which comprises subjecting a reaction mixture consisting essentially of said alcohol, a substantially anhydrous alkali metal compound selected from the group consisting of alkali metal oxides and hydroxides, and between 0.5 and 8 mol percent water based on said alkali metal compound to oxidative dehydrogenation conditions and thereafter recovering said organic acid salt.

9. A process according to claim 8 wherein the water content is between 2.5 and 7.5 mol percent based on said alkali metal compound.

10. A process according to claim 8 wherein the water content is between 3 and 6 mol percent based on said alkali metal compound.

11. A process according to claim 8 wherein the alkali metal compound is sodium hydroxide.

12. A process according to claim 10 wherein the alkali metal compound is sodium hydroxide.

13. A process according to claim 11 wherein the alcohol is isooctyl alcohol.

14. A process according to claim 11 wherein the alcohol is decyl alcohol.

15. A process according to claim 11 wherein the alcohol is tridecyl alcohol.

16. A process for the preparation of an organic acid which comprises subjecting a reaction mixture consisting essentially of at least one oxygen-containing organic compound reactant selected from the group consisting of unsubstituted aliphatic and unsubstituted monocyclic aralkyl primary alcohols having between 1 and 40 carbon atoms; unsubstituted aliphatic and unsubstituted monocyclic aralkyl aldehydes having between 1 and 40 carbon atoms; unsubstituted aliphatic aldols having between 1 and 40 carbon atoms; unsubstituted aliphatic acetals having between 1 and 40 carbon atoms and at least two hydrogen atoms on at least one of the carbon atoms adjacent to at least one of the ether oxygen atoms; unsubstituted aliphatic monoethers having between 1 and 40 carbon atoms and at least two hydrogen atoms on at least one of the carbon atoms adjacent to the ether oxygen atom; and organic esters having between 1 and 40 carbon atoms wherein the acid and alcohol portions of the ester are aliphatic hydrocarbon radicals, a substantially anhydrous alkali metal compound selected from the group consisting of alkali metal oxides and hydroxides and between 0.5 and 8 mol percent water based on the alkali metal compound employed under oxidative dehydrogenation conditions to form a salt of said organic acid, and while the reaction temperature is above the melting point of said acid salt adding a mineral acid selected from the group consisting of hydrochloric, sulfuric, phosphoric, sulfurous, phosphorus and hydrobromic to the reaction mixture at a rate between 0.25 and 3 mols of mineral acid per mol of acid salt per hour to form the desired organic acid.

17. A process according to claim 16 wherein said mineral acid is aqueous hydrochloric acid.

18. A process according to claim 17 wherein the reaction temperature before the addition of the aqueous hydrochloric acid is between 220° and 260° C.

19. A process according to claim 16 wherein the oxygen-containing organic compound reactant is the polymer bottoms from the hydroformylation and subsequent hydrogenation of olefins having between 2 and 39 carbon atoms per molecule.

20. A process according to claim 19 wherein the polymer bottoms is the 224° C. plus fraction of the product prepared by the hydroformylation and subsequent hydrogenation of at least one olefin having nine carbon atoms per molecule.

21. A process according to claim 16 wherein the oxygen-containing oganic compound reactant is isooctyl alcohol.

22. A process according to claim 16 wherein the oxygen-containing organic compound reactant is tridecyl alcohol.

References Cited

UNITED STATES PATENTS 2,766,267   10/1956   Hill _____ 260—413

ALEX MAZEL, *Primary Examiner.*

NICHOLAS S. RIZZO, *Examiner.*

J. A. NARCAVAGE, *Assistant Examiner.*

UNITED STATES PATENT OFFICE
CERTIFICATE OF CORRECTION

Patent No. 3,370,074                      February 20, 1968

Harold L. Dimond et al.

It is hereby certified that error appears in the above numbered patent requiring correction and that the said Letters Patent should read as corrected below.

Column 3, lines 56 to 60, for that portion of the formula reading

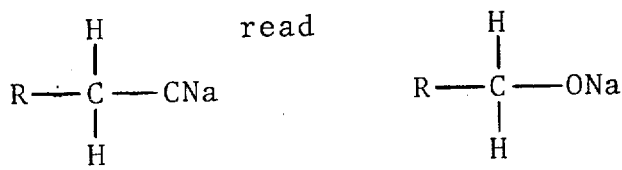 read 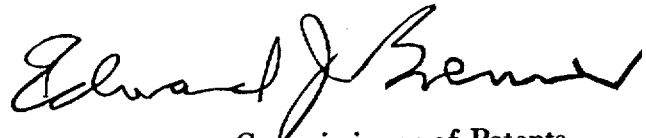

Signed and sealed this 6th day of May 1969.

(SEAL)
Attest:

Edward M. Fletcher, Jr.
Attesting Officer
                                     Commissioner of Patents